United States Patent
Jung et al.

(10) Patent No.: US 12,081,964 B2
(45) Date of Patent: Sep. 3, 2024

(54) TERMINAL AND METHOD FOR OUTPUTTING MULTI-CHANNEL AUDIO BY USING PLURALITY OF AUDIO DEVICES

(71) Applicant: LG ELECTRONICS INC., Seoul (KR)

(72) Inventors: Sungwon Jung, Seoul (KR); Tacksung Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 209 days.

(21) Appl. No.: 17/641,747

(22) PCT Filed: Aug. 21, 2020

(86) PCT No.: PCT/KR2020/011206
§ 371 (c)(1),
(2) Date: Mar. 9, 2022

(87) PCT Pub. No.: WO2022/039310
PCT Pub. Date: Feb. 24, 2022

(65) Prior Publication Data
US 2022/0303707 A1    Sep. 22, 2022

(51) Int. Cl.
*H04S 7/00*     (2006.01)
*G06T 7/70*     (2017.01)
(Continued)

(52) U.S. Cl.
CPC .............. *H04S 7/303* (2013.01); *G06T 7/70* (2017.01); *G06V 20/50* (2022.01); *H04S 3/008* (2013.01);
(Continued)

(58) Field of Classification Search
None
See application file for complete search history.

(56) References Cited

U.S. PATENT DOCUMENTS

2005/0190928 A1    9/2005  Noto
2007/0104341 A1*   5/2007  Kondo ................. G06T 7/70
                                                      381/388
(Continued)

FOREIGN PATENT DOCUMENTS

JP      2013-236354 A    11/2013
KR  10-2015-0106649 A     9/2015
(Continued)

OTHER PUBLICATIONS

Shim et al, KR20100096537. EPO translation. (Year: 2009).*
International Search Report for PCT/KR2020/011206 mailed on May 20, 2021.

*Primary Examiner* — Qin Zhu
(74) *Attorney, Agent, or Firm* — Birch, Stewart, Kolasch & Birch, LLP

(57) ABSTRACT

A terminal for outputting multi-channel audio using a plurality of audio devices, the terminal can include a camera; a communication interface configured to communicate with a plurality of first audio devices; and a processor configured to receive device information about the plurality of first audio devices through the communication interface or the camera; configure a multi-channel audio system including at least two second audio devices selected from among the plurality of first audio devices based on the device information; and output audio data through the at least two second audio devices based on audio system information corresponding to the multi-channel audio system.

14 Claims, 9 Drawing Sheets

(51) Int. Cl.
 *G06V 20/50* (2022.01)
 *H04M 1/60* (2006.01)
 *H04S 3/00* (2006.01)
 *H04S 5/00* (2006.01)

(52) U.S. Cl.
 CPC . *G06T 2207/20092* (2013.01); *H04S 2400/01* (2013.01); *H04S 2400/13* (2013.01)

(56) References Cited

U.S. PATENT DOCUMENTS

| | | | |
|---|---|---|---|
| 2009/0123007 A1* | 5/2009 | Katayama | H04S 7/302 |
| | | | 381/300 |
| 2012/0113224 A1 | 5/2012 | Nguyen et al. | |
| 2015/0264502 A1* | 9/2015 | Aoki | H04S 5/005 |
| | | | 381/17 |
| 2016/0004499 A1 | 1/2016 | Kim et al. | |
| 2016/0007117 A1* | 1/2016 | Ohashi | H04S 7/40 |
| | | | 381/303 |
| 2017/0070817 A1 | 3/2017 | Seo et al. | |
| 2019/0281403 A1* | 9/2019 | Møller | H04R 5/04 |
| 2020/0204939 A1* | 6/2020 | Kim | H04S 7/302 |
| 2020/0267473 A1* | 8/2020 | Matsukawa | H04R 13/00 |
| 2021/0337340 A1* | 10/2021 | Wey | H04N 5/607 |
| 2022/0095074 A1* | 3/2022 | Reddy | G06T 7/70 |
| 2022/0194389 A1* | 6/2022 | Kim | B60W 40/08 |
| 2023/0195409 A1* | 6/2023 | Choi | H04R 3/00 |
| | | | 381/58 |

FOREIGN PATENT DOCUMENTS

| | | |
|---|---|---|
| KR | 10-2019-0119012 A | 10/2019 |
| KR | 10-2020-0040531 A | 4/2020 |

\* cited by examiner

TERMINAL AND METHOD FOR OUTPUTTING MULTI-CHANNEL AUDIO BY USING PLURALITY OF AUDIO DEVICES

CROSS-REFERENCE TO RELATED APPLICATION

This application is the National Phase of PCT International Application No. PCT/KR2020/011206, filed on Aug. 21, 2020, all of which are hereby expressly incorporated by reference into the present application.

BACKGROUND OF THE DISCLOSURE

The present disclosure relates to a terminal outputting multi-channel audio using a plurality of audio devices and a method therefor.

An existing multi-channel audio system includes audio devices, the output channels of which are previously determined and preset, and require professional help in the arrangement of the audio devices for the correct multi-channel audio output. Therefore, even if a user has a plurality of audio devices constituting a multi-channel audio system, there has been great difficulty in installing the plurality of audio devices at suitable positions. In addition, in order to construct a multi-channel audio system, it is necessary to provide an apparatus according to a combination of various audio devices capable of outputting a sound of a predetermined channel.

If a multi-channel audio system can be constructed by combining different mono-channel audio devices or stereo-channel audio devices provided in the home, high-satisfaction audio can be provided to a user at a low cost. For example, a user may already own many different wireless devices made by different manufactures that are able to output audio (e.g., at least mono-channel audio), but the existing art does not provide a convenient way to combine and configure disparate audio devices into a single system capable of providing multi-channel sound (e.g., surround sound, stereo sound).

SUMMARY OF THE DISCLOSURE

The present disclosure provides a terminal for outputting multi-channel audio using a plurality of audio devices and a method therefor.

In addition, the present disclosure provides a terminal for providing suitable arrangement positions of a plurality of audio devices constituting a multi-channel audio system (e.g., even in a situation where the audio devices made by different manufacturers).

An embodiment of the present disclosure provides a terminal for outputting multi-channel audio using a plurality of audio devices, the terminal including: a camera; a communication unit connected to a plurality of first audio devices; and a processor configured to obtain device information about the plurality of first audio devices through the communication unit or the camera, configure a multi-channel audio system including at least two second audio devices among the plurality of first audio devices in consideration of the device information, and output audio data through the second audio devices based on audio system information corresponding to the multi-channel audio system.

The device information may include audio channel information and volume level information about each of the plurality of first audio devices.

The processor may be configured to: obtain first image data including the first audio device through the camera, specify the first audio device included in the first image data; and obtain device information corresponding to the specified first audio device.

The audio system information may include audio channel information of the multi-channel audio system, and audio channel allocation information, volume level information, and arrangement position information about the second audio devices.

The processor may be configured to: obtain second image data for a listening space of the multi-channel audio system through the camera; and determine the arrangement position information based on the second image data.

The processor may be configured to: obtain first image data including the first audio device through the camera; specify the first audio device included in the first image data; and obtain device information corresponding to the specified first audio device.

The audio system information may include audio channel information of the multi-channel audio system, and audio channel allocation information, volume level information, and arrangement position information about the second audio devices.

The processor may be configured to: obtain second image data for a listening space of the multi-channel audio system through the camera; and determine the arrangement position information based on the second image data.

The terminal may further include an input unit, in which the processor may be configured to: obtain listening position information in the second image data from a user through the input unit; and determine the arrangement position information based on the listening position information.

The terminal may further include a display unit, in which the processor may be configured to output the arrangement position information about the second audio devices through the display unit.

The processor may be configured to: up-mix the audio data when the number of channels of the audio data is less than the number of channels of the audio channel information; and output the up-mixed audio data through the second audio devices.

The communication unit may be configured to receive, from the up-mixing server, the up-mixed audio data corresponding to the audio data.

The processor may be configured to: determine a sound effect based on audio characteristics of the audio data; and output the audio data through the second audio devices by reflecting the sound effect thereto.

The sound effect may include at least one of an equalizer or a stereophonic sound.

The processor may be configured to analyze the audio characteristics corresponding to the audio data using an audio analysis model including an artificial neural network.

In addition, an embodiment of the present disclosure provides a method for outputting multi-channel audio using a plurality of audio devices, the method including: connecting to a plurality of first audio devices through a communication unit; obtaining device information about the plurality of first audio devices through the communication unit or a camera; configuring a multi-channel audio system including at least two second audio devices among the plurality of first audio devices in consideration of the device information; and outputting audio data through the second audio devices based on audio system information corresponding to the multi-channel audio system.

In addition, an embodiment of the present disclosure provides a recording medium having recorded thereon a method of outputting multi-channel audio using a plurality of audio devices, the method including: connecting to a plurality of first audio devices through a communication unit; obtaining device information about the plurality of first audio devices through the communication unit or a camera; configuring a multi-channel audio system including at least two second audio devices among the plurality of first audio devices in consideration of the device information; and outputting audio data through the second audio devices based on audio system information corresponding to the multi-channel audio system.

According to various embodiments of the present disclosure, a multi-channel audio system that is not supported by an individual audio device may be configured by combining a plurality of audio devices.

In addition, according to various embodiments of the present disclosure, arrangement positions suitable for audio channels allocated to individual audio devices may be automatically determined and provided to a user.

In addition, according to various embodiments of the present disclosure, up-mixed audio data may be output through an audio device even when that audio device does not natively support up-mixing.

Furthermore, according to various embodiments of the present disclosure, audio data may be output by applying a sound effect suitable for audio characteristics of the audio data.

DETAILED DESCRIPTION OF THE EMBODIMENTS

Figure 1:
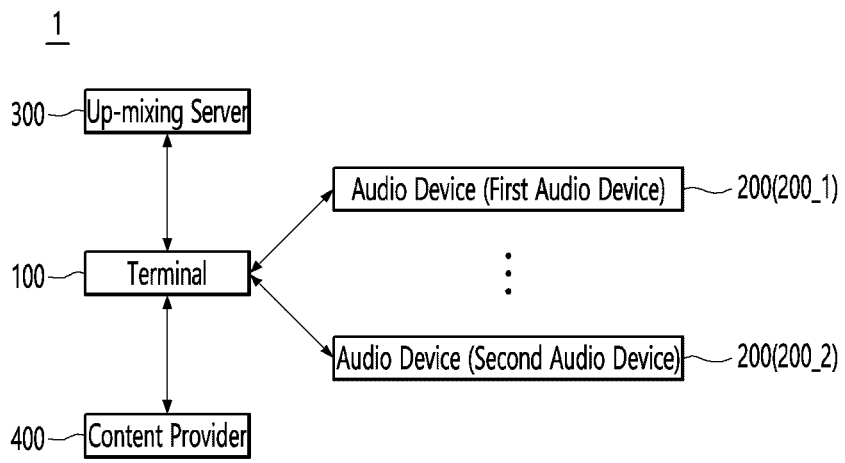
FIG. 1 is a diagram illustrating a multi-channel audio output system according to an embodiment of the present disclosure.

Hereinafter, embodiments of the present disclosure are described in detail with reference to accompanying drawings and regardless of the reference symbols, same or similar components are assigned with the same reference numerals and thus overlapping descriptions for those are omitted. The suffixes 'module' and 'unit' for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It will be understood that the present disclosure includes all modifications, equivalents, and substitutes falling within the spirit and scope of various embodiments of the disclosure.

It will be understood that although the terms "first," "second" etc. may be used herein to describe various elements, these elements should not be limited by these terms. These terms are only used to distinguish one element from another.

It will be understood that when an element is "connected" or "coupled" to another element, the element may be directly connected or coupled to the other element or may be connected or coupled to the other element with an intervening element therebetween. On the other hand, it will be understood that when an element is "directly connected" or "directly coupled" to another element, no intervening element is present therebetween. Instances of the word "may" used in the disclosure are synonymous with the term "can" and include the definition thereof.

The terminal 100 may be implemented as a stationary device or a movable device, such as a TV, a projector, a mobile phone, a smartphone, a desktop computer, a notebook computer, a digital broadcasting terminal, a personal digital assistant (PDA), a portable multimedia player (PMP), a navigation, a tablet PC, a wearable device, a set-top box (STB), a DMB receiver, a radio, a washing machine, a refrigerator, a digital signage, a robot, and a vehicle.

FIG. 1 is a diagram illustrating a multi-channel audio output system 1 according to an embodiment of the present disclosure.

Referring to FIG. 1, the multi-channel audio output system 1 may include a terminal 100, a plurality of audio devices 200, an up-mixing server 300, and a content provider 400.

The terminal 100 may refer to a device that connects to the audio devices 200 using a wireless communication technology, outputs a sound through the audio devices 200, and controls the audio devices 200. Since the terminal 100 provides an audio signal or audio data to the audio devices 200, the terminal 100 may be regarded as an audio signal providing device or an audio data providing device.

The terminal 100 may output multi-channel audio through the plurality of audio devices 200 even in a situation where one or more of the plurality of audio devices natively supports only mono-channel audio. For example, the terminal 100 may output multi-channel audio by transmitting audio signals of different channels to the audio devices 200. In this situation, the audio devices 200 that output multi-channel audio may be grouped together and referred to as a single multi-channel audio system. That is, the plurality of audio devices 200 may operate as a single audio system, and such an audio system may operate as a single audio device including a plurality of different sound output units (e.g., each audio device can be assigned to a different audio channel). For example, even if two audio devices 200 each include only one sound output unit, one of the two audio devices 200 outputs a left channel sound corresponding to a left channel audio signal, and the other one thereof may output a right channel sound corresponding to the right channel audio signal. Therefore, the two audio devices 200 may operate together as a single stereo audio device.

The terminal 100 may transmit and receive a pairing signal, a positioning signal, an audio signal, and the like, with the audio device 200 using a wireless communication technology. The pairing signal may refer to a signal transmitted and received to connect the audio device 200 to the terminal 100. The positioning signal may refer to a signal transmitted and received to measure a relative position between the terminal 100 and the audio device 200. The audio signal may refer to a signal that the terminal 100 transmits to the audio device 200 to output audio through the audio device 200.

The terminal 100 may receive content data including audio data from the content provider 400 using wired/wireless communication technology, and may transmit, to the audio device 200, audio data corresponding to the received audio data. Alternatively, the terminal 100 may transmit, to the audio device 200, audio data corresponding to the audio data stored in the memory 170.

The audio device 200 may be connected to the terminal 100 using a wireless communication technology, and may output audio based on the audio data received from the terminal 100. To this end, the audio device 200 may include at least one sound output unit or speaker.

The audio device 200 may include one or more sound output units 340. The audio device 200 may output audio of the same channel through each sound output unit 340, or may output audio of different channels. For example, the audio device 200 may include two sound output units, such as headphones or neckband earphones. In this case, the audio device 200 may output left channel audio and right channel audio through each sound output unit.

In an embodiment, when the plurality of audio devices 200 operate together as a single group, one wireless acoustic device may function as a master wireless acoustic device, and the other wireless acoustic device may function as a slave wireless acoustic device. In this situation, even if the terminal 100 is connected only to the master wireless acoustic device, audio may also be output from the slave wireless acoustic device through the master wireless acoustic device. In addition, the terminal 100 may be connected to the slave wireless acoustic device through the master wireless acoustic device, and may output sound from the slave acoustic device.

In an embodiment, when the plurality of audio devices 200 operate together as a single group, the terminal 100 may be connected all the audio devices 200 and output audio by individually transmitting audio data to each audio device 200 (e.g., each of the plurality of audio devices 200 can be supplied with a different audio channel in order provide an immersive, surround sound experience, such as three-dimensional sound).

Among the audio devices 200, the audio devices connected to the terminal 100 may be referred to as first audio devices 200_1. Among the first audio devices 200_1, audio devices constituting the multi-channel audio system may be referred to as second audio devices 200_2. Since the second audio device 200_2 is also connected to the terminal 100, the second audio device 200_2 may also be referred to as a first audio device 200_1, and vice versa.

The up-mixing server 300 may up-mix audio data received from the terminal 100 using a wired/wireless communication technology, and may provide the up-mixed audio data to the terminal 100. Up-mixing or audio up-mixing may refer to an operation of expanding the number of channels of audio data. For example, the up-mixing server 300 may receive two-channel audio data from the terminal 100, may up-mix the received audio data into 5.1-channel audio data (e.g., 6.1 or 7.1 channel sound, etc., depending on the number of available audio devices and their respective audio units), and may transmit the 5.1-channel audio data to the terminal 100.

The up-mixing server 300 may be configured as a single server, or may be configured as a cloud server or a server cluster including a plurality of servers.

The content provider 400 may provide video content data or audio content data to the terminal 100 using a wired/wireless communication technology. The video content or the audio content data may include audio data.

The content provider 400 may refer to various content providing devices, such as a radio base station, a terrestrial base station, a broadcast satellite, and a content data server.

Figure 2:
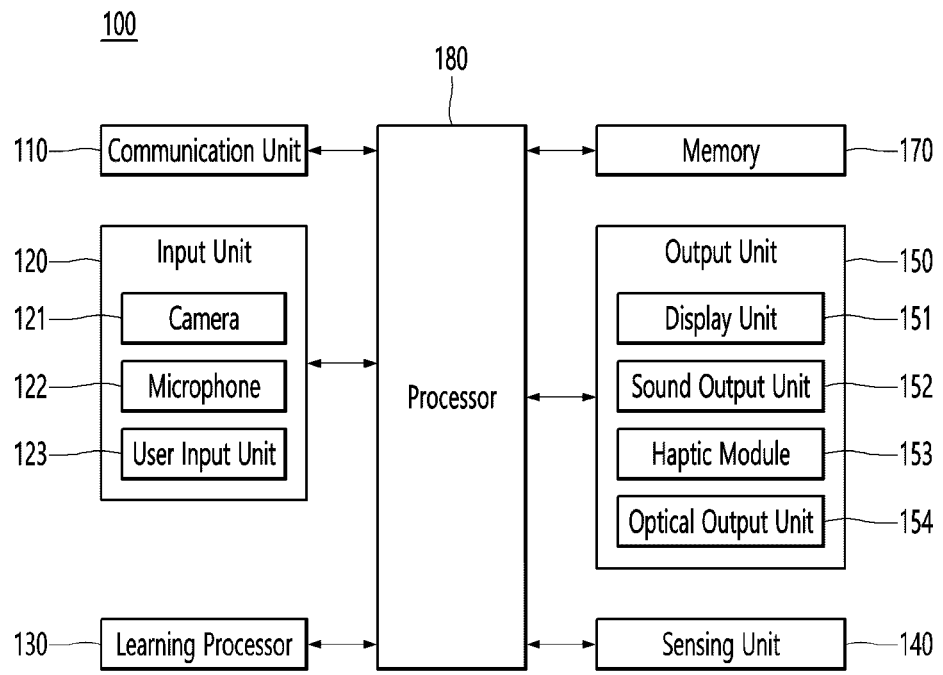
FIG. 2 is a block diagram illustrating a terminal that outputs multi-channel audio using a plurality of audio devices, according to an embodiment of the present disclosure.

FIG. 2 is a block diagram illustrating the terminal 100 that outputs multi-channel audio using a plurality of audio devices, according to an embodiment of the present disclosure.

Referring to FIG. 2, the terminal 100 may include a communication unit 110 (e.g., a communication interface or communication transceiver), an input unit 120 (e.g., an input interface including various ports), a learning processor 130, a sensing unit 140 (e.g., one or more sensors), an output unit 150 (e.g., output interface and/or output devices or components), a memory 170, and a processor 180.

The communication unit 110 may also be referred to as a communication interface, communication transceiver, communication modem or a communication circuit.

The communication unit 110 may transmit and receive data to and from external devices, such as the audio device 200 using a wired/wireless communication technology. For example, the communication unit 110 may transmit and receive sensor information, a user input, a learning model, a control signal, and the like to and from external devices.

The communication technology used by the communication unit 110 includes Global System for Mobile communication (GSM), Code Division Multi Access (CDMA), Long Term Evolution (LTE), 5G, Wireless LAN (WLAN), Wireless-Fidelity (Wi-Fi), BLUETOOTH™, Radio Frequency Identification (RFID), Infrared Data Association (IrDA), ZIGBEE, Near Field Communication (NFC), and the like.

The input unit 120 may be referred to as an input interface.

The input unit 120 may obtain various types of data.

The input unit 120 may include a camera 121 for inputting an image signal, a microphone 122 for receiving an audio signal, a user input unit 123 for receiving information from a user, and the like. By treating the camera 121 or the microphone 122 as a sensor, a signal obtained from the camera 121 or the microphone 122 may be referred to as sensing data or sensor information.

Voice data or image data collected by the input unit 120 may be analyzed and processed as a user control command.

The input unit 120 may obtain training data for model learning, input data to be used to obtain an output using the learning model, and the like. The input unit 120 may obtain raw input data. In this situation, the processor 180 or the learning processor 130 may extract an input feature by preprocessing the input data.

The camera 121 processes an image frame, such as a still image, a moving image or video, obtained by an image sensor in a video call mode or a capturing mode. The processed image frame may be displayed on a display unit 151, or may be stored in the memory 170.

The microphone 122 processes an external sound signal into electrical voice data. The processed voice data may be utilized in various ways according to a function being executed by the terminal 100 (or a running application program). On the other hand, various noise cancellation algorithms for canceling noise generated in a process of receiving an external sound signal may be applied to the microphone 122.

The user input unit 123 is configured to receive information from a user. When information is input through the user input unit 123, the processor 180 may control the operation of the terminal 100 to correspond to the input information.

The user input unit 123 may include a mechanical input means (e.g., a button located on the front/rear or side of the terminal 100, a dome switch, a jog wheel, a jog switch, etc.) and a touch input means. For example, the touch input means may include a virtual key, a soft key, or a visual key displayed on a touch screen through software processing, or may include a touch key disposed on a portion other than the touch screen.

The learning processor 130 may learn a model including an artificial neural network using training data. The learned artificial neural network may be referred to as a learning model. The learning model may be used to infer a result value with respect to new input data other than the training data, and the inferred value may be used as a basis for a determination to perform a certain operation.

The learning processor 130 may perform AI processing together with a learning processor of an artificial intelligence server.

The learning processor 130 may include a memory integrated or implemented in the terminal 100. Alternatively, the learning processor 130 may be implemented using the memory 170, an external memory directly coupled to the terminal 100, or a memory maintained in an external device.

The sensing unit 140 may be referred to as a sensor unit or a sensor.

The sensing unit 140 may use various sensors to obtain at least one of internal information of the terminal 100, surrounding environment information of the terminal 100, or user information.

Sensors included in the sensing unit 140 include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, a radar, and the like.

The output unit 150 may be referred to as an output interface.

The output unit 150 may generate an output related to sight, hearing, or touch. The output unit 150 may include at least one of the display unit 151, a sound output unit 152, a haptic module 153, or an optical output unit 154.

The display unit 151 displays (outputs) information processed by the terminal 100. For example, the display unit 151 may display execution screen information of an application program driven in the terminal 100 or user interface (UI) and graphic user interface (GUI) information according to the execution screen information.

The display unit 151 may implement a touch screen by forming a mutual layer structure with the touch sensor or being integrally formed with the touch sensor. The touch screen may function as the user input unit 123 providing an input interface between the terminal 100 and the user, and may also provide an output interface between the terminal 100 and the user.

The sound output unit 152 may output audio data received from the communication unit 110 or stored in the memory 170 in a call signal reception, a call mode or a recording mode, a voice recognition mode, a broadcast reception mode, and the like. The sound output unit 152 may include at least one of a receiver, a speaker, or a buzzer.

The haptic module 153 generates various tactile effects that a user can feel. A representative example of the tactile effect generated by the haptic module 153 may be vibration.

The optical output unit 154 outputs a signal for notifying the occurrence of an event by using light of a light source of the terminal 100. Examples of the event generated in the terminal 100 may include message reception, call signal reception, missed call, alarm, schedule notification, email reception, information reception through an application, and the like.

The memory 170 may store data supporting various functions of the terminal 100. For example, the memory 170 may store input data, learning data, a learning model, a learning history, and the like, which are obtained from the input unit 120.

The processor 180 may control overall operations of the terminal 100.

Image signals that are image-processed by the processor 180 may be input to the display unit 151 (e.g., one or more displays, or projectors) and displayed as images corresponding to the image signals. In addition, image signals that are image-processed by the processor 180 may be input to an external output device through an external device interface unit.

Audio signals that are processed by the processor 180 may be output through the sound output unit 152. In addition, audio signals that are processed by the processor 180 may be input to an external output device through an external device interface unit.

The processor 180 may determine at least one executable operation of the terminal 100 based on information determined or generated using a data analysis algorithm or a machine learning algorithm. In addition, the processor 180 may perform the determined operation by controlling the elements of the terminal 100. To this end, the processor 180 may request, retrieve, receive, or utilize data of the learning processor 130 or memory 170, and may control the elements of the terminal 100 to perform a predicted operation or an operation determined to be desirable among the at least one executable operation.

When the interconnection of the external device is required to perform the determined operation, the processor 180 may generate a control signal for controlling the corresponding external device and transmit the generated control signal to the corresponding external device.

The processor 180 may obtain intention information with respect to a user input, and may determine a user's requirement based on the obtained intention information.

The processor 180 may obtain intention information corresponding to a user input using at least one of a speech to text (STT) engine for converting a voice input into a character string or a natural language processing (NLP) engine for obtaining intention information of a natural language. At least one of the STT engine or the NLP engine may be configured as an artificial neural network, at least a portion of which is learned according to a machine learning algorithm. At least one of the STT engine or the NLP engine is learned by the learning processor 130, may be learned by the learning processor of the artificial intelligence server, or may be learned by the distributed processing thereof.

The processor 180 may collect history information including operation contents of the terminal 100 or a user feedback for the operation, and may store the collected history information in the memory 170 or the learning processor 130, or may transmit the collected history information to the artificial intelligence server or the like. The collected historical information may be used to update the learning model.

The processor 180 may control at least some elements of the terminal 100 in order to drive the application program stored in the memory 170. Furthermore, the processor 180 may drive the application program by combining two or more of the elements included in the terminal 100.

On the other hand, the terminal 100 illustrated in FIG. 1 is only one embodiment of the present disclosure, and thus some elements illustrated in FIG. 1 may be integrated, added, or omitted according to the specification of the terminal 100 to be actually implemented.

In an embodiment, two or more elements may be integrated into one element, or one element may be divided into two or more elements. In addition, the functions performed by each block are provided for describing an embodiment of the present disclosure, and specific operations or devices thereof do not limit the scope of the present disclosure.

Figure 3:
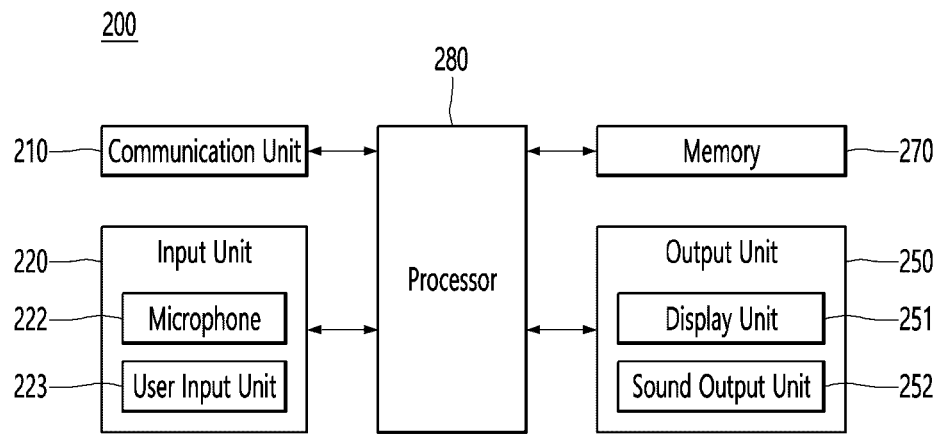
FIG. 3 is a block diagram illustrating an audio device according to an embodiment of the present disclosure.

FIG. 3 is a block diagram illustrating an audio device 200 according to an embodiment of the present disclosure.

Referring to FIG. 3, the audio device 200 may include a communication unit 210, an input unit 220, an output unit 250, a memory 270, and a processor 280.

The communication unit 210 may also be referred to as a communication modem or a communication circuit.

The communication unit 210 may transmit and receive data to and from external devices such as the terminal 100 using a wired/wireless communication technology. For example, the communication unit 110 may transmit and receive sensor information, a user input, a learning model, a control signal, and the like to and from external devices.

The communication technology used by the communication unit 210 includes Global System for Mobile communication (GSM), Code Division Multi Access (CDMA), Long Term Evolution (LTE), 5G, Wireless LAN (WLAN), Wireless-Fidelity (Wi-Fi), Bluetooth™, Radio Frequency Identification (RFID), Infrared Data Association (IrDA), ZigBee, Near Field Communication (NFC), and the like.

The communication unit 210 may receive an FM radio signal or an AM radio signal from a radio base station.

The input unit 220 may be referred to as an input interface.

The input unit 220 may include a microphone 222 for receiving an audio signal, a user input unit 223 for receiving information from a user, and the like. By treating the microphone 222 as a sensor, a signal obtained from the microphone 222 may be referred to as sensing data or sensor information.

Voice data or image data collected by the input unit 220 may be analyzed and processed as a user control command.

The microphone 222 processes an external sound signal into electrical voice data. The processed voice data may be utilized in various ways according to a function being executed by the terminal 200 (or a running application program). On the other hand, various noise cancellation algorithms for canceling noise generated in a process of receiving an external sound signal may be applied to the microphone 222.

The user input unit 223 is configured to receive information from a user. When information is input through the user input unit 223, the processor 280 may control the operation of the terminal 200 to correspond to the input information.

The user input unit 223 may include a mechanical input means (e.g., a button located on the front/rear or side of the terminal 200, a dome switch, a jog wheel, a jog switch, etc.) and a touch input means. For example, the touch input means may include a virtual key, a soft key, or a visual key displayed on a touch screen through software processing, or may include a touch key disposed on a portion other than the touch screen.

The output unit 250 may be referred to as an output interface.

The output unit 250 may generate an output related to sight, hearing, or touch. The output unit 250 may include at least one of a display unit 151, a sound output unit 152, a haptic module 153, or an optical output unit 154.

The display unit 251 displays (outputs) information processed by the terminal 200. For example, the display unit 251 may display execution screen information of an application program driven in the terminal 200 or user interface (UI) and graphic user interface (GUI) information according to the execution screen information.

The display unit 251 may implement a touch screen by forming a mutual layer structure with the touch sensor or being integrally formed with the touch sensor. The touch screen may function as the user input unit 223 providing an input interface between the terminal 200 and the user, and may also provide an output interface between the terminal 200 and the user.

The sound output unit 252 may output audio data received from the communication unit 210 or stored in the memory 270 in a call signal reception, a call mode or a recording mode, a voice recognition mode, a broadcast reception mode, and the like. The sound output unit 252 may include at least one of a receiver, a speaker, or a buzzer.

The sound output unit 252 may include a diaphragm, an acoustic coil, and a permanent magnet that forms a magnetic field around the acoustic coil. When power is applied to the acoustic coil, electromagnetic force may be generated within the magnetic field formed by the permanent magnet to move the acoustic coil, and the diaphragm may vibrate according to the movement of the acoustic coil to output sound.

The memory 270 may store data supporting various functions of the audio device 200. For example, the memory 270 may store input data obtained from the input unit 220, audio data received from the terminal 100, and the like.

The processor 280 may control overall operations of the audio device 200.

Figure 4:
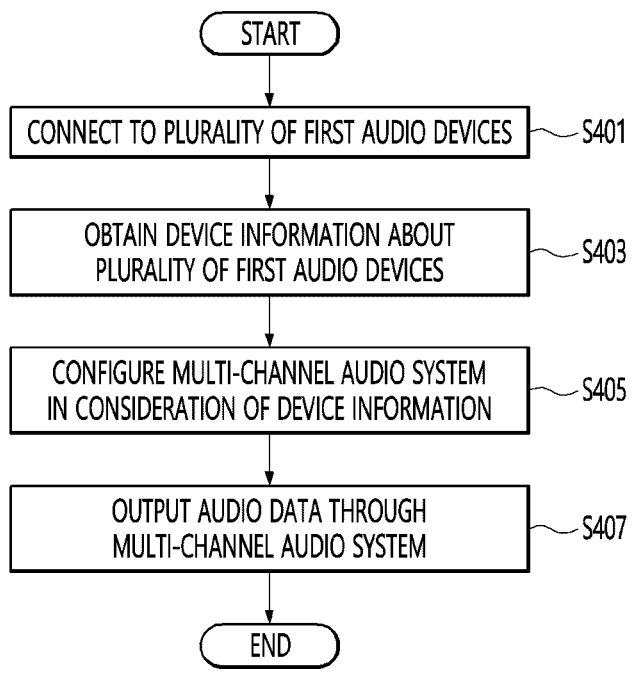
FIG. 4 is a flowchart illustrating a method for outputting multi-channel audio using a plurality of audio devices, according to an embodiment of the present disclosure.

FIG. 4 is a flowchart illustrating a method for outputting multi-channel audio using a plurality of audio devices, according to an embodiment of the present disclosure.

Referring to FIG. 4, the processor 180 of the terminal 100 connects to the plurality of first audio devices 200_1 through the communication unit 110 (S401).

Since the audio devices 200 connected to the terminal 100 are referred to as first audio devices 200_1, step S401 described above may be regarded as follows: the processor 180 of the terminal 100 connects to the plurality of audio devices 200 through the communication unit 110.

The terminal 100 and the first audio devices 200_1 may be connected by pairing with each other. To this end, the first audio devices 200_1 may transmit a pairing request signal (or a connection request signal), and the terminal 100 may establish a connection with the first audio devices 200_1 transmitting the pairing request signal by scanning the devices transmitting the pairing request signal.

The processor 180 of the terminal 100 obtains device information about the plurality of first audio devices 200_1 through the communication unit 110 or the camera 121 (S403).

The processor 180 may receive, from the first audio devices 200_1, device information about the first audio devices 200_1 through the communication unit 110. Specifically, the terminal 100 may receive device information from the already connected first audio devices 200_1 or the first audio devices 200_1 transmitting the connection request signal to establish a connection.

Alternatively, the processor 180 may obtain first image data including the first audio devices 200_1 through the camera 121, may specify the first audio devices 200_1 included in the first image data, and may obtain device information about the specific first audio devices 200_1. To this end, the processor 180 may specify the first audio devices 200_1 from the first image data using an object recognition model, and may receive device information about the identified first audio devices 200_1 through the Internet or an external server.

The device information may include a device name, a device model name, a device serial number, audio channel information, sound level information, equalizer information, and the like. The audio channel information may refer to the number of audio channels that can be output by the audio device 200 and configuration information of the audio channels. In order to output multi-channel audio using the plurality of audio devices 200, the processor 180 may obtain audio channel information about the first audio devices 200_1.

Although FIG. 4 illustrates that step S403 of obtaining the device information about the first audio devices 200_1 is performed after step S401 of connecting to the first audio devices 200_1 is performed, the present disclosure is not limited thereto. That is, according to an embodiment, step S401 of connecting the terminal 100 to the first audio devices 200_1 and step S403 of obtaining the device information about the first audio devices 200_1 may be simultaneously performed, or may be performed in the reverse order.

The processor 180 of the terminal 100 configures a multi-channel audio system including at least two second audio devices 200_2 among the plurality of first audio devices 200_1 in consideration of the device information (S405).

The processor 180 may determine an audio channel of each of the first audio devices 200_1 in consideration of the device information about the plurality of connected first audio devices 200_1, and may configure, based on this, a multi-channel audio system including at least two second audio devices 200_2 among the plurality of first audio devices 200_1.

The processor 180 may generate audio system information while configuring the multi-channel audio system. The audio system information may include audio channel information of the multi-channel audio system, audio channel allocation information about each of the second audio devices 200_2, volume level information, arrangement position information, and the like.

Furthermore, the processor 180 may output the audio system information about the configured multi-channel audio system through the output unit 150.

The processor 180 may output the second audio devices 200_2 constituting the multi-channel audio system, the audio channel allocation information about each of the second audio devices 200_2, the volume level information about each of the second audio devices 2002, or the arrangement position information about each of the second audio devices 200_2, based on the audio system information.

The processor 180 outputs arrangement position information about each of the second audio devices 200_2 through the output unit 150 so that the user is guided to arrange the second audio devices 200_2 at positions suitable for the configured multi-channel audio system. For example, the processor 180 can automatically determine optimal locations for placing the audio devices around a room based on where a user is likely to sit or be located, in order to provide an optimized surrounding sound experience using the different audio devices together as a group to provide different audio channels (e.g., left audio, right audio, center audio, base, rear left audio, rear right audio, etc.).

Furthermore, the processor 180 may inquire whether to configure the multi-channel audio system to the user through the output unit 150, and may or may not configure the multi-channel audio system based on a user input.

The processor 180 of the terminal 100 outputs audio data through the multi-channel audio system (S407).

The processor 180 may output audio data stored in the memory 170 or audio data received from the content provider 300 through the second audio devices 200_2 constituting the multi-channel audio system.

Figure 8:
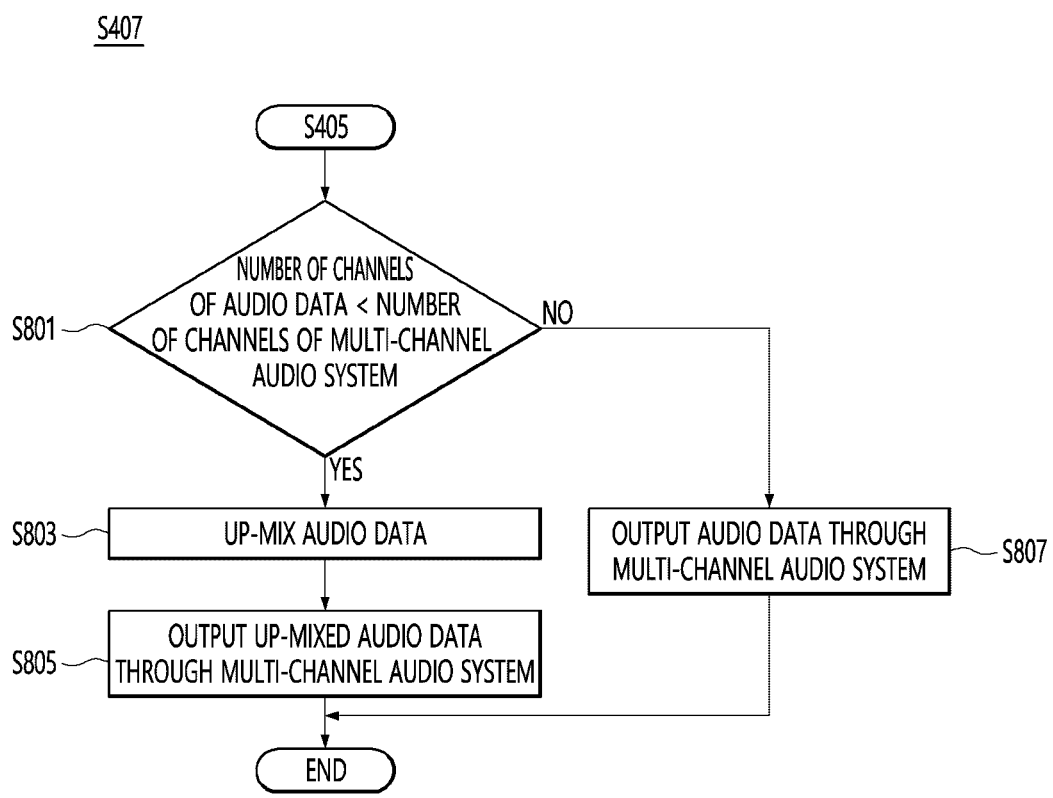
FIG. 8 is a flowchart illustrating an example of outputting audio data through the multi-channel audio system illustrated in FIG. 4 according to an embodiment of the present disclosure.
Figure 10:
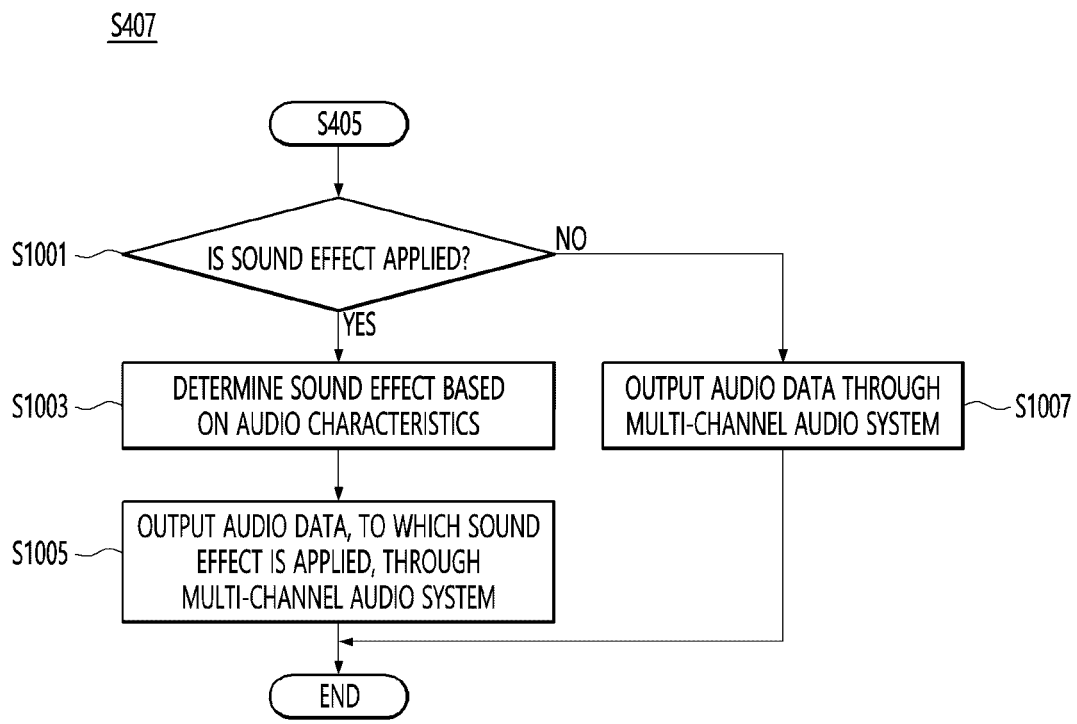
FIG. 10 is a flowchart illustrating an example of outputting audio data through the multi-channel audio system illustrated in FIG. 4 according to an embodiment of the present disclosure.

As illustrated in FIG. 8, the processor 180 may up-mix audio data based on audio channel information of the multi-channel audio system, and may output the up-mixed audio data through the multi-channel audio system. In addition, as illustrated in FIG. 10, the processor 180 may determine a sound effect (e.g., three-dimensional surround sound) in consideration of audio characteristics of the audio data, and may output up-mixed audio data, to which the sound effect is applied, through the multi-channel audio system. In addition, the processor 180 may up-mix audio data, apply the sound effect thereto, and output the resultant data through a multi-channel audio system. When both the up-mixing of the audio data and the application of the sound effect are performed, it does not matter which one is performed first.

The order of the steps illustrated in FIG. 4 is only an example, and the present disclosure is not limited thereto. That is, the order of some steps illustrated in FIG. 4 may be changed and performed. In addition, the order of some steps illustrated in FIG. 4 may be performed in parallel. In addition, only some steps illustrated in FIG. 4 may be performed.

Figure 5:
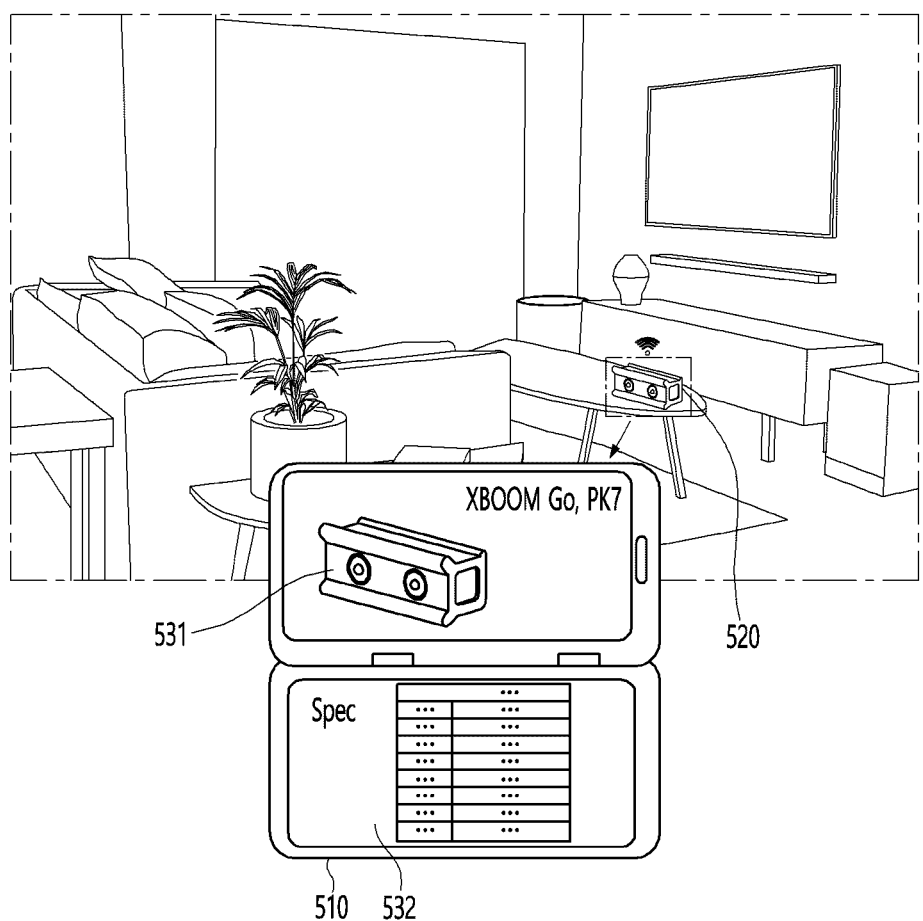
FIG. 5 is a diagram illustrating an example of obtaining device information of an audio device using a camera of a terminal according to an embodiment of the present disclosure.

FIG. 5 is a diagram illustrating an example of obtaining device information of an audio device using a camera of a terminal.

Referring to FIG. 5, the terminal 510 may obtain image data (or first image data) 531 including an audio device 520 through a camera, may specify the audio device 520 by identifying the audio device 520 included in the obtained image data, and may obtain device information 532 of the specified audio device 520.

The terminal 510 may directly identify and specify the audio device 520 from the image data, but may transmit the image data to a separate external server and obtain identification information of the audio device 520 included in the image data from the external server.

Furthermore, the terminal 510 may output the device information 532 of the audio device 520 through the display unit.

In the example illustrated in FIG. 5, the terminal 510 includes a plurality of display units, but the present disclosure is not limited thereto. That is, the terminal 510 may include one display unit or a plurality of display units.

Figure 6:
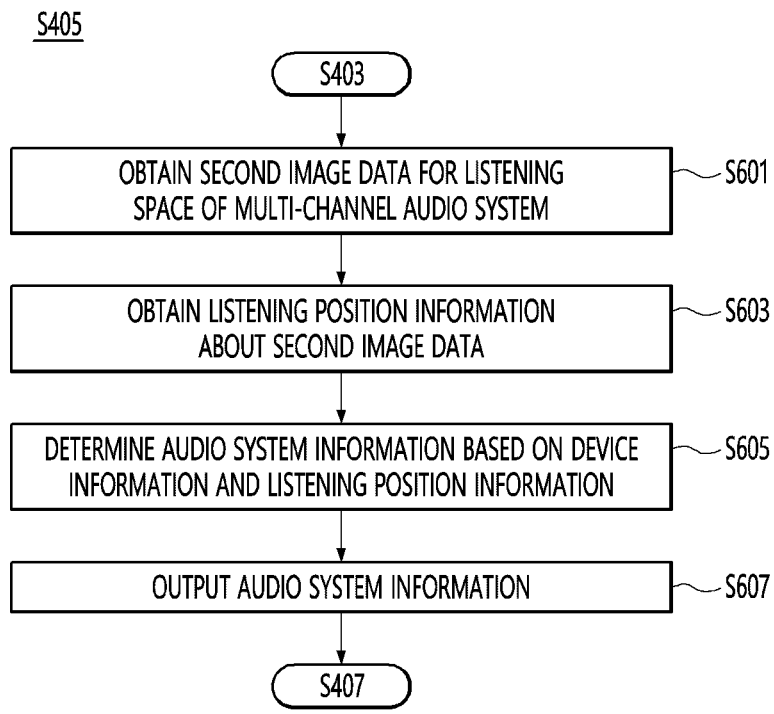
FIG. 6 is a flowchart illustrating an example of configuring the multi-channel audio system illustrated in FIG. 4 according to an embodiment of the present disclosure.

FIG. 6 is a flowchart illustrating an example of step S405 of configuring the multi-channel audio system illustrated in FIG. 4.

Referring to FIG. 6, the processor 180 of the terminal 100 obtains second image data for a listening space of the multi-channel audio system through the camera 121 (S601).

The listening space of the multi-channel audio system may refer to a space in which a plurality of second audio devices 200_2 constituting the multi-channel audio system are to be arranged and may also refer to a space for listening to audio output through the plurality of audio devices 200_2 (e.g., a TV room in the user's home).

The processor 180 of the terminal 100 obtains listening position information about the second image data through the input unit 120 (S603).

The processor 180 may output the second image data through the display unit 151, and may obtain the listening position information about the second image data through the user input unit 123. When the display unit 151 is a touch screen capable of a touch input, the processor 180 may obtain the listening position information about the second image data through the display unit 151.

The processor 180 of the terminal 100 determines audio system information based on the device information and the listening position information about the first audio devices 200_1 (S605).

The processor 180 may determine second audio devices 200_2 to configure the multi-channel audio system based on the audio channel information of each of the first audio devices 200_1, and may determine audio channel allocation information and volume level information about each of the second audio devices 200_2. In addition, the processor 180 may determine arrangement position information about the second audio devices 200_2 based on the audio channel allocation information, the volume level information, and the listening position information about the second audio devices 200_2. For example, the processor 180 can obtain a picture of all the available audio devices located within a room, analyze specification information for each of the audio devices (even when the audio devices are made by different companies and for different purposes, such as a smart hub device, a virtual assistant speaker, a mono-channel Bluetooth speaker, etc.), automatically assign a different audio channel to each of the audio devices for providing multi-channel audio (e.g., surround sound) tailored to the capabilities of each audio device, and automatically and strategically determine optimal locations for positioning the devices around the room based on where a user is likely to sit or be located when listening to the audio devices.

The processor 180 of the terminal 100 outputs the audio system information through the display unit 151 (S607).

The processor 180 may display, through the display unit 151, a list of the second audio devices 200_2 constituting the multi-channel audio system, audio channel information allocated to each of the second audio devices 200_2, and arrangement positions of the second audio devices 200_2. In particular, the processor 180 may display the arrangement positions of the second audio devices 200_2 on the second image data.

Figure 7:
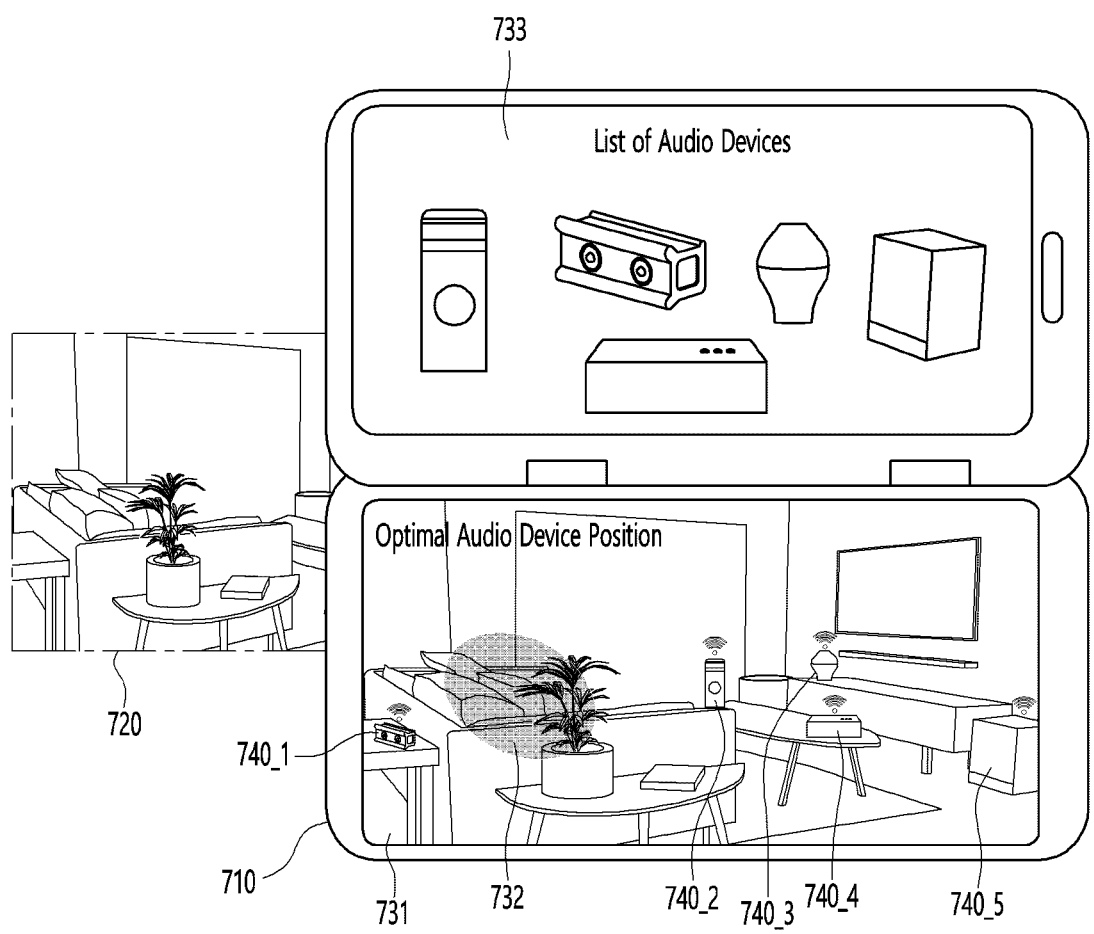
FIG. 7 is a diagram illustrating an example of outputting audio system information in a terminal according to an embodiment of the present disclosure.

FIG. 7 is a diagram illustrating an example of outputting audio system information in a terminal.

Referring to FIG. 7, a terminal 710 may obtain image data (or second image data) 731 for a listening space 720 of the multi-channel audio system through the camera, may obtain listening position information 732 for the image data 731 obtained through the input unit 120, and may configure a multi-channel audio system based on device information of audio devices 740_1 to 740_5 and the listening position information 732.

The image data 731 for the listening space 720 may refer to image data captured for providing augmented reality (AR).

The display unit of the terminal 710 may be a touch screen, the terminal 710 may output the second image data 731 to the display unit, and a user may input the listening position information 732 by touching the listening position (e.g., by touch selecting a spot on a couch within an image of the room, etc.) in the second image data 731 output to the display unit.

As described above, the terminal 710 may constitute the multi-channel audio system by determining the second audio devices 740_1 to 740_5 to configure the multi-channel audio system among the connected first audio devices, and determining audio system information including audio channel allocation information about each of the second audio devices 740_1 to 740_5, volume level information about each of the second audio devices 740_1 to 740_5, and arrangement position information about each of the second audio devices 740_1 to 740_5.

The terminal 710 may output a list 733 of the second audio devices 740_1 to 740_5 constituting the multi-channel audio system through the display unit.

The terminal 710 may output the second image data 731 and the arrangement positions of each of the second audio devices 740_1 to 740_5 constituting the multi-channel audio system through the display unit. In this case, the terminal 710 may display the first image data 531 of the second audio devices 740_1 to 740_5 at a position corresponding to the determined arrangement position information on the second image data 731.

In the example illustrated in FIG. 7, the terminal 710 includes a plurality of display units, but the present disclosure is not limited thereto. That is, the terminal 710 may include one display unit or a plurality of display units.

FIG. 8 is a flowchart illustrating an example of step S407 of outputting the audio data through the multi-channel audio system illustrated in FIG. 4.

Referring to FIG. 8, the processor 180 of the terminal 100 determines whether the number of channels of the audio data is less than the number of channels of the multi-channel audio system (S801).

The processor 180 may check the number of channels of the multi-channel audio system through audio channel information of the audio system information. For example, when the processor 180 configures six second audio devices 200_2 as one multi-channel audio system, the audio channel information of the audio system information may be 5.1 channels.

As a result of the determination in step S801, when the number of channels of the audio data is less than the number of channels of the multi-channel audio system, the processor 180 of the terminal 100 up-mixes the audio data (S803) and outputs the up-mixed audio data through the multi-channel audio system (S805).

The processor 180 may directly up-mix the audio data according to the number of audio channels of the multi-channel audio system, or may up-mix the audio data through the up-mixing server 300. The processor 180 may transmit the audio data and the audio channel information of the multi-channel audio system to the up-mixing server 300 through the communication unit 110, the up-mixing server 300 may up-mix the audio data based on the received audio data and the received audio channel information of the multi-channel audio system, and the processor 180 may receive the up-mixed audio data from the up-mixing server 300 through the communication unit 110.

As a result of the determination in step S801, when the number of channels of the audio data is not less than the number of channels of the multi-channel audio system, the processor 180 of the terminal 100 outputs the audio data, which are not up-mixed, through the multi-channel audio system (S807).

Although FIG. 8 illustrates an example in which the terminal 100 up-mixes the audio data when the number of channels of the audio data is less than the number of channels of the multi-channel audio system, the present disclosure is not limited thereto. In another embodiment, even when the number of channels of the audio data is less than the number of channels of the multi-channel audio system, the terminal 100 may output the audio data through the multi-channel audio system without up-mixing the audio data.

Figure 9:
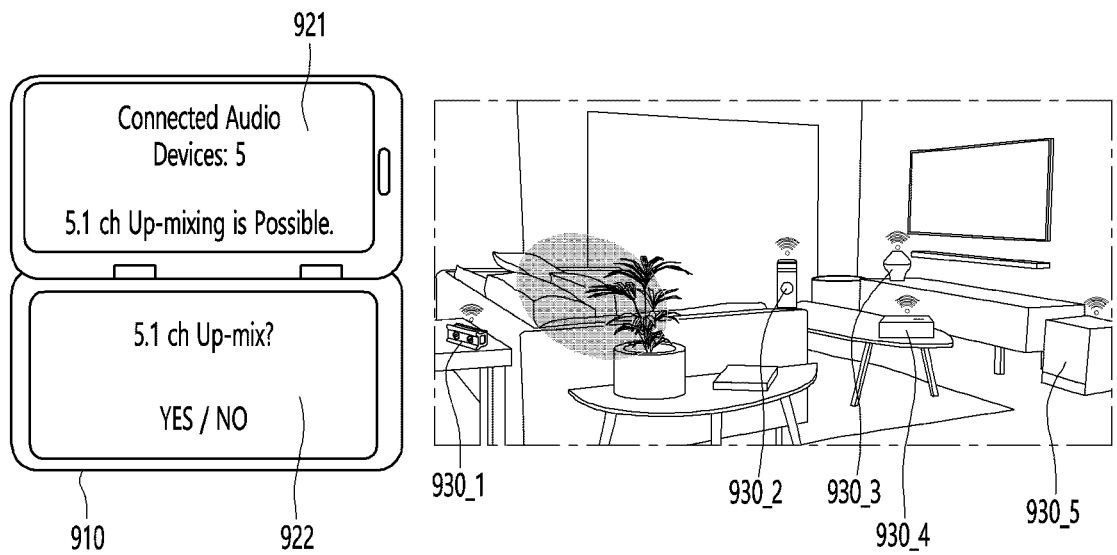
FIG. 9 is a diagram illustrating an example of up-mixing audio data according to an embodiment of the present disclosure.

FIG. 9 is a diagram illustrating an example of up-mixing audio data.

Referring to FIG. 9, after configuring the multi-channel audio system, the terminal 910 may output the number of audio devices 930_1 to 930_5 constituting the multi-channel audio system and up-mixing information corresponding to the multi-channel audio system (921).

In addition, when the terminal 910 configures the multi-channel audio system, or when the terminal 910 outputs the audio data through the multi-channel audio system, the terminal 910 may output a notification asking whether to up-mix the audio data according to the multi-channel audio system (922).

FIG. 10 is a flowchart illustrating an example of the step S407 of outputting the audio data through the multi-channel audio system illustrated in FIG. 4.

Referring to FIG. 10, the processor 180 of the terminal 100 determines whether to apply a sound effect (e.g., Standard, Movie, Bass Blast, ASC (Adaptive Sound Control), Music mode, 5.1, 6.1 channel surround sound, etc.) when outputting audio data (S1001).

The processor 180 may determine whether to apply the sound effect when outputting the audio data based on a user input through the input unit 120 or a predetermined setting value. The sound effect may include at least one of an equalizer or a stereophonic sound.

When it is determined in step S1001 to apply the sound effect, the processor 180 of the terminal 100 determines the sound effect based on audio characteristics of the audio data (S1003), and outputs the audio data to which the sound effect is applied through the multi-channel audio system (S1005).

The processor 180 may analyze the audio characteristics of the audio data in consideration of frequency distribution, voice, background sound, etc. of sound waves included in the audio data, and may determine the sound effect based on the analyzed audio characteristics of the audio data.

The processor 180 may determine the content of the audio data based on the audio characteristics of the audio data, and may determine the sound effect to be applied to the audio data by selecting a preset sound effect corresponding to the determined content.

The processor 180 may determine a mode flag for the sound effect based on the content of the audio data, and may apply the sound effect according to the determined mode flag. [Table 1] below shows examples of the mode flag for the sound effect.

TABLE 1

| Mode flag | Sound effect | Content |
|---|---|---|
| 0 | Center Boosting | News, Sports |
| 1 | Widening | Music |
| 2 | Widening Surround | Movie |
| 3 | Default | Entertainment show |

Referring to [Table 1] above, "Center Boosting" stereophonic sound effect may be applied to audio data corresponding to news or sports, which are mostly voice components, "Widening" stereophonic sound effect may be applied to audio data corresponding to two-channel music with a lot of background sound, "Widening Surround" stereophonic sound effect may be applied to audio data corresponding to movie, and no stereophonic sound effect may not be applied to audio data corresponding to an entertainment show that is difficult to give a stereophonic effect due to frequent scene changes. The processor 180 may analyze audio characteristics of the audio data using an audio analysis model configured with an artificial neural network. For example, the audio analysis model may be a model that determines and outputs the content or genre included in the audio data when the audio data is input, or may be a model that determines and outputs the sound effect or the mode flag to be applied to the audio data when the audio data is input.

The processor 180 may determine the sound effect by directly analyzing the audio data of the audio data, or may determine the sound effect by analyzing the audio data through an external server (e.g., the up-mixing server 300, etc.). The processor 180 may transmit the audio data to the external server through the communication unit 110, the external server may determine the sound effect by analyzing audio characteristics of the received audio data, and the processor 180 may receive the determined sound effect information from the external server through the communication unit 110.

The processor 180 may apply the sound effect to the audio data and output the audio data by transmitting, to the second audio device 2002, information about the determined sound effect (e.g., the mode flag) together with the audio data. Alternatively, the processor 180 may apply the sound effect to the audio data and output the audio data by transmitting the audio data, to which the sound effect is applied, to the second audio device 200_2 after applying the sound effect to the audio data.

When the sound effect is not applied as a result of the determination in step S1001, the processor 180 of the terminal 100 outputs audio data, to which no sound effect is applied, through the multi-channel audio system (S1007).

Figure 11:
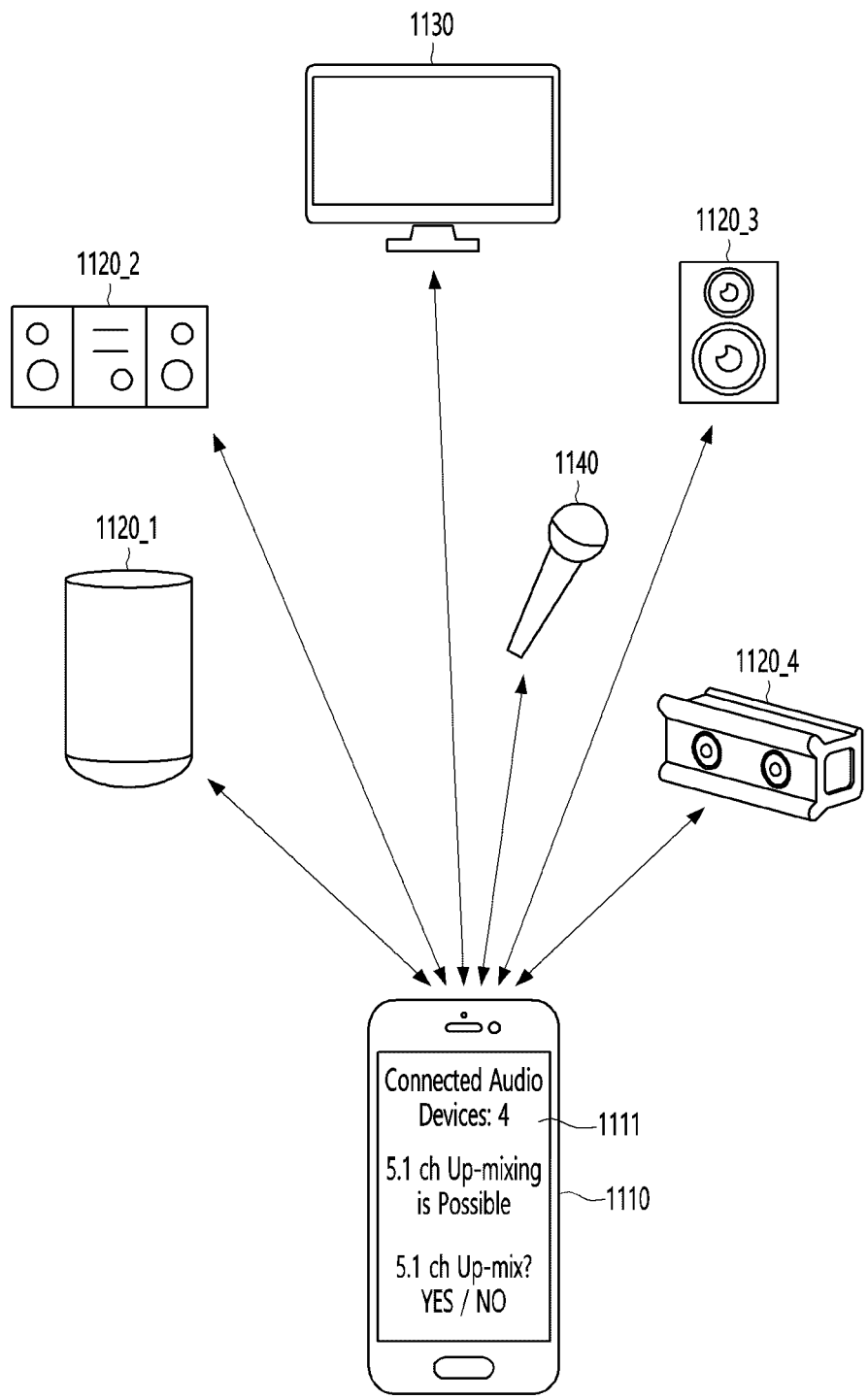
FIGS. 11 and 12 are diagrams illustrating a multi-channel audio output system according to an embodiment of the present disclosure.
Figure 12:
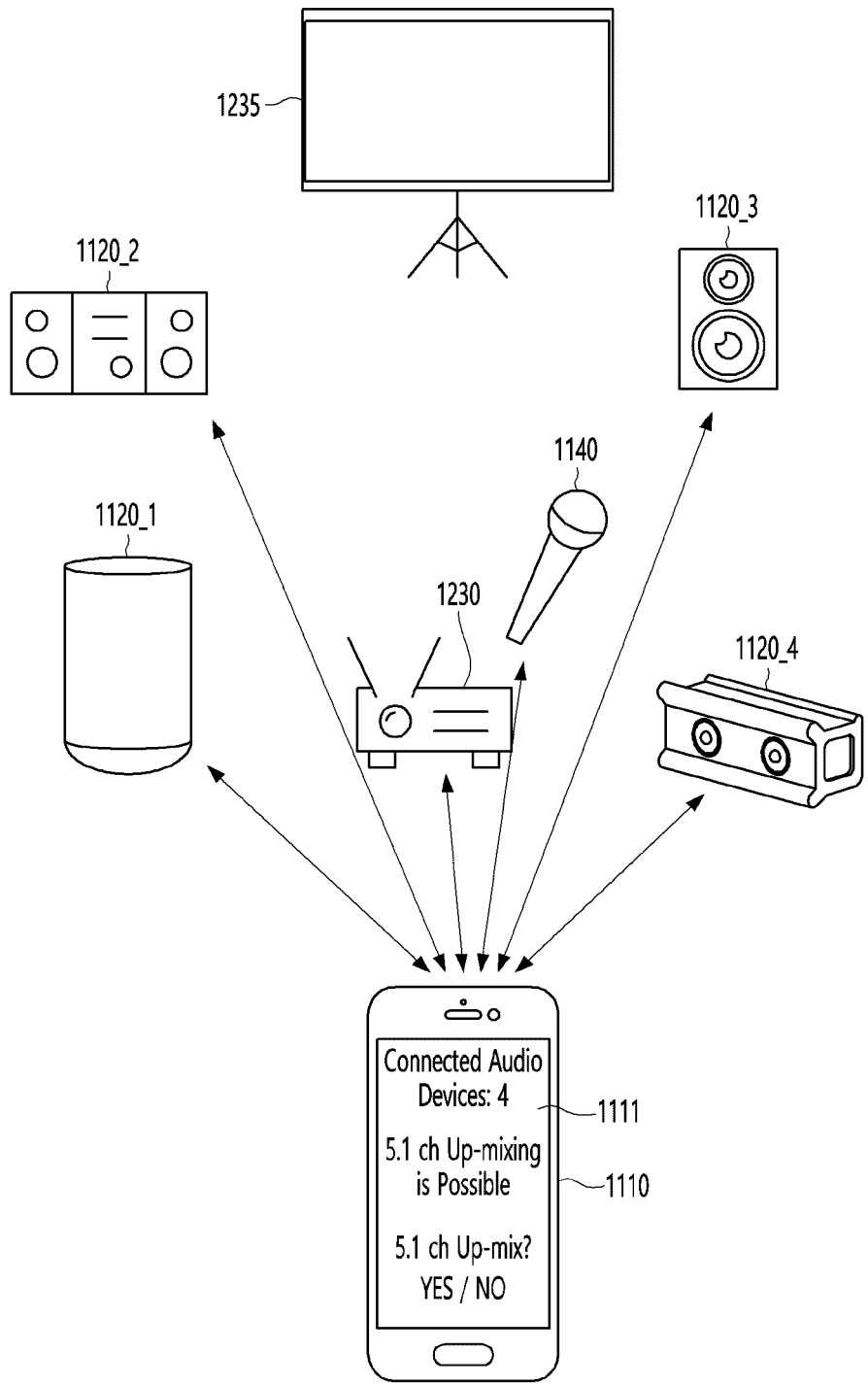

FIGS. 11 and 12 are diagrams illustrating multi-channel audio output systems 1100 and 1200 according to an embodiment of the present disclosure.

Referring to FIGS. 11 and 12, the multi-channel audio output systems 1100 and 1200 according to embodiments of the present disclosure may include a terminal 1110, a plurality of audio devices 1120_1 to 1120_4, display devices 1130 and 1230, and a microphone 1140. In FIG. 11, the display device 1130 may be a device such as a TV or a monitor including a display panel. In FIG. 12, the display device 1230 may be a projector that projects light corresponding to an image onto a wall or screen 1235 through a light source.

The terminal 1110 may connect to a plurality of audio devices 1120_1 to 1120_4, may configure a multi-channel audio system with the connected audio devices 1120_1 to 1120_4, and may output audio data through the plurality of audio devices 1120_1 to 1120_4 configuring the multi-channel audio system. The terminal 1110 may output information about the multi-channel audio system and a notification asking whether up-mixing corresponding to the multi-channel audio system is possible and whether to perform up-mixing through the display unit (1111).

The terminal 1110 may connect to the display devices 1130 and 1230 and output image data through the connected display device 1130. In addition, the terminal 1110 may connect to the microphone 1140 and receive audio data through the connected microphone 1140.

The terminal 1110 may configure the multi-channel audio system with the plurality of audio devices 1120_1 to 1120_4 and transmit audio system information of the multi-channel audio system to the connected display devices 1130 and 1230. In addition, the terminal 1110 may determine the arrangement position information of each of the audio devices 1120_1 to 1120_4 in consideration of the audio channel allocated to each of the plurality of audio devices 1120_1 to 1120_4, and may output the determined arrangement position information through the display unit. Therefore, even after the display devices 1130 and 1230 are disconnected from the terminal 1110, the display devices 1130 and 1230 may output multi-channel audio through the plurality of audio devices 1120_1 to 1120_4 constituting the multi-channel audio system.

In an embodiment, the multi-channel audio output systems 1100 and 1200 may provide a home karaoke service. To this end, the terminal 1110 may execute a karaoke application, may display a karaoke application screen through the display devices 1130 and 1230, may output the sound of the karaoke application through the plurality of audio devices 1120_1 to 1120_4, and may receive the user's voice through the microphone 1140.

In an embodiment, the multi-channel audio output systems 1100 and 1200 may provide a home cinema service. To this end, the terminal 1110 may display an image of video content through the display devices 1130 and 1230, and may output audio of the video content through the plurality of audio devices 1120_1 to 1120_4.

Also, the terminal 1110 may receive content including audio data from a separate content provider 400. In addition, the terminal 1110 may up-mix audio data through a separate up-mixing server 300.

According to an embodiment of the present disclosure, the above-described method can be implemented with codes readable by a computer on a medium in which a program is recorded. A computer-readable medium includes any types of recording devices in which data readable by a computer system is stored. Examples of the computer-readable medium include hard disk drive (HDD), solid state disk (SSD), silicon disk drive (SDD), ROM, RAM, CD-ROM, magnetic tape, floppy disk, optical data storage device, and the like.

The invention claimed is:

1. A method of controlling a terminal device to configure a plurality of audio devices to perform as a multi-channel audio system, the method comprising:
   wirelessly connecting to a plurality audio devices via a wireless communication interface of the terminal device;
   receiving device information about the plurality of audio devices;
   determining, via a controller in the terminal device, at least two audio devices from among the plurality of audio devices to act as a group to provide a multi-channel audio system based on the device information;
   obtaining, via a camera in the terminal device, an image of a listening space including the at least two audio devices;
   obtaining the device information based on the image, wherein the device information includes capability information for the at least two audio devices;
   assigning first and second audio channel data to first and second audio devices, respectively, based on the capability information;
   receiving audio data;
   transmitting the first audio channel data based on the audio data to the first audio device among the at least two audio devices; and
   transmitting the second audio channel data based on the audio data to the second audio device among the at least two audio devices.

2. The method of claim 1, further comprising:
   determining placement information for arranging the first and second audio devices at different locations within the listening space based on the device information; and
   displaying the placement information on a display of the terminal device.

3. The method of claim 1, further comprising:
   in response to a number of audio channels within the audio data being less than a number of audio channels available for output by the multi-channel audio system including the first and second devices, up-mixing the audio to generate up-mixed audio data; and
   outputting the up-mixed audio data by the first and second devices.

4. The method of claim 1, wherein each of the first and second audio devices is a mono-channel audio device capable of only outputting one audio channel at a time,
   wherein stereo sound is output by the multi-channel audio system including the first and second devices by outputting left sound channel data by the first audio device and right sound channel data by the second audio device, and
   wherein the first and second audio devices are separate devices made by different manufacturers.

5. The method of claim 1, further comprising:
   determining an optimal listening position based on the device information, the image of the listening space, and the placement information; and displaying listening position information indicating the optimal listening position.

6. The method of claim 1, further comprising:
determining a sound effect to apply to the audio data; and
outputting the audio data via the first and second devices according to the sound effect.

7. The method of claim 6, wherein the sound effect is determined based on at least one of a user input, a predetermined setting, a mode flag, and an analysis result.

8. A method of controlling a terminal device to configure a plurality of audio devices to perform as a multi-channel audio system, the method comprising:
wirelessly connecting to a plurality audio devices via a wireless communication interface of the terminal device;
receiving device information about the plurality of audio devices;
determining, via a controller in the terminal device, at least two audio devices from among the plurality of audio devices to act as a group to provide a multi-channel audio system based on the device information;
obtaining, via a camera in the terminal device, an image of a listening space including the at least two audio devices;
displaying the image of the listening space on a display of the terminal device;
receiving a user input selection selecting a spot within the image;
determining placement information for arranging first and second audio devices at different locations within the listening space based on the spot selected by the user input;
displaying the placement information on the display of the terminal device;
receiving audio data;
transmitting first audio channel data corresponding to the audio data to the first audio device among the at least two audio devices; and
transmitting second audio channel data corresponding to the audio data to the second audio device among the at least two audio devices.

9. The method of claim 8, further comprising:
in response to a number of audio channels within the audio data being less than a number of audio channels available for output by the multi-channel audio system including the first and second devices, up-mixing the audio to generate up-mixed audio data; and
outputting the up-mixed audio data by the first and second devices.

10. The method of claim 8, wherein each of the first and second audio devices is a mono-channel audio device capable of only outputting one audio channel at a time.

11. The method of claim 9, wherein stereo sound is output by the multi-channel audio system including the first and second devices by outputting left sound channel data by the first audio device and right sound channel data by the second audio device.

12. The method of claim 10, wherein the first and second audio devices are separate devices made by different manufacturers.

13. The method of claim 8, further comprising:
determining a sound effect to apply to the audio data; and
outputting the audio data via the first and second devices according to the sound effect.

14. The method of claim 13, wherein the sound effect is determined based on at least one of a user input, a predetermined setting, a mode flag, and an analysis result.

* * * * *